Patented June 17, 1952

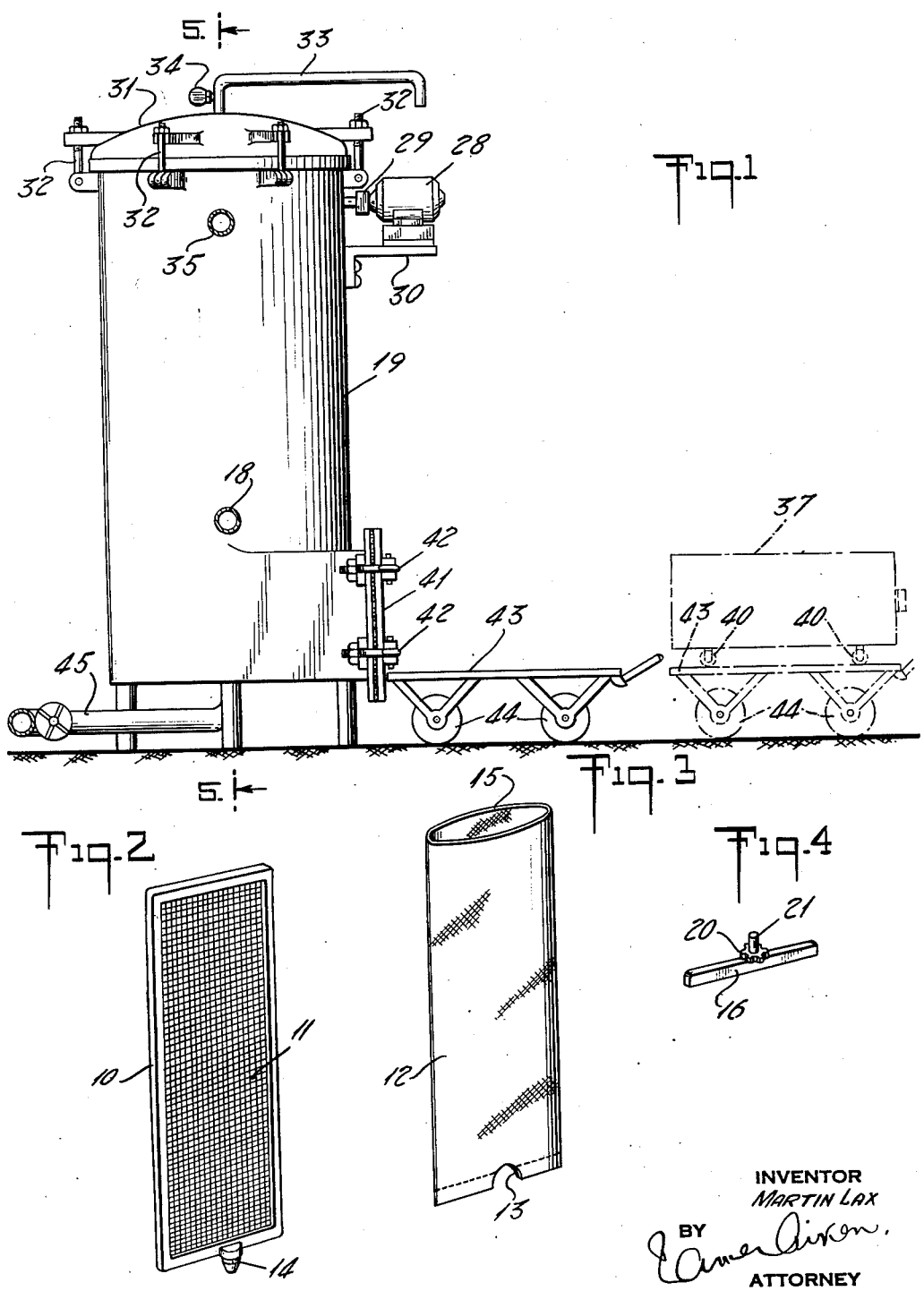

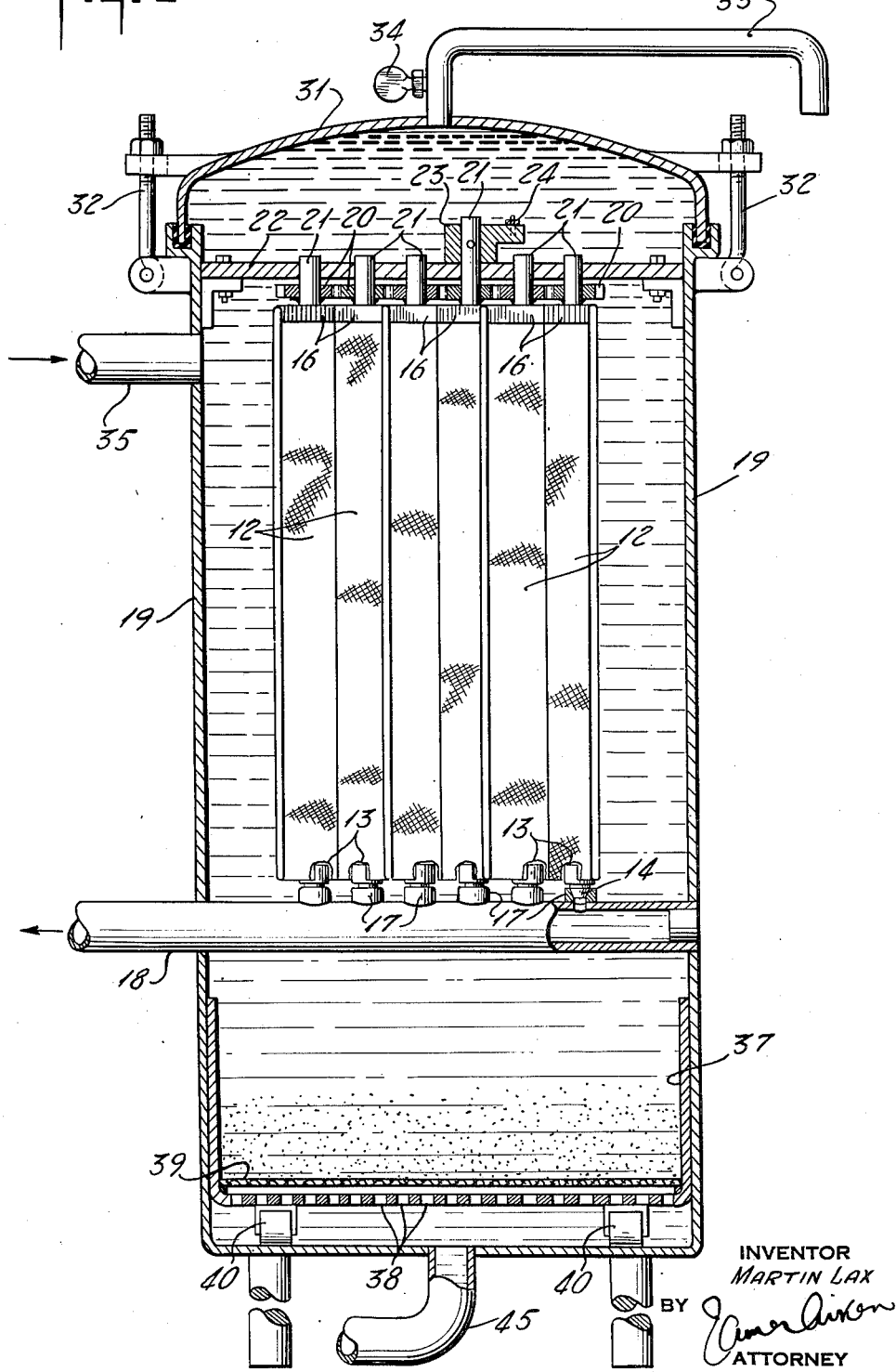

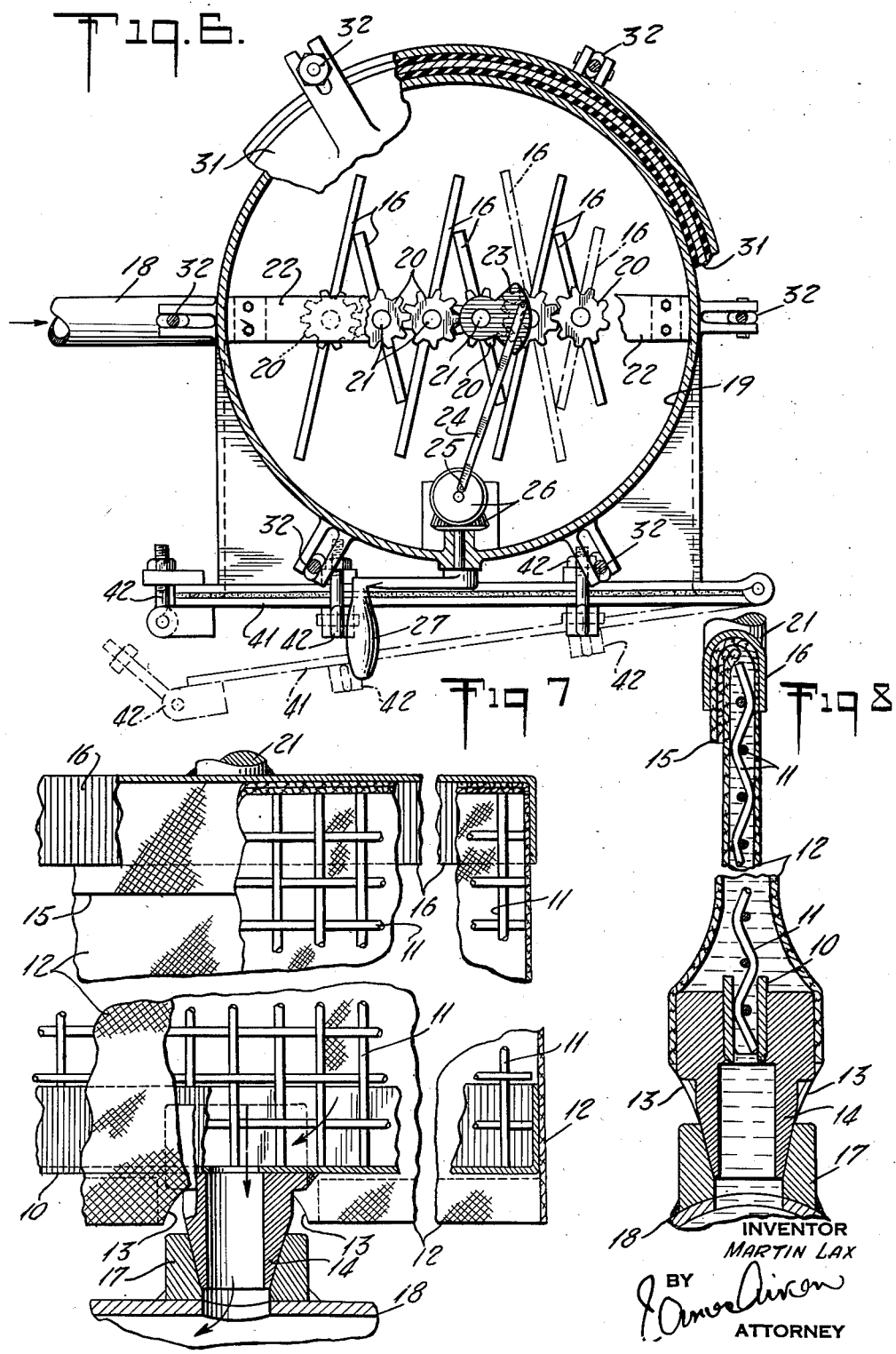

2,601,156

UNITED STATES PATENT OFFICE 2,601,156

FILTER MECHANISM

Martin Lax, Bronx, N. Y.

Application April 20, 1948, Serial No. 22,135

12 Claims. (Cl. 210—182)

This invention relates to improvements in the filter mechanism of dry-cleaning machines and like apparatus of the type in which renewable filters are contained in a chamber through which the cleaning fluid or solvent is caused to circulate to remove dirt and foreign matter therefrom.

In such filter apparatus as usually employed, a plurality of flat filter members are assembled in parallel relation to each other and it is necessary to remove the filters from their container at brief intervals in order that the accumulated dirt may be scraped or otherwise removed from the exterior of the filter members.

One object of the present invention is to provide an arrangement whereby a plurality of vertically disposed filters may be turned about vertical axes so that the dirt accumulated on the external surfaces of the filters is loosened and caused to settle to the lower part of the casing.

Another object is to provide the individual filter members with rocking means whereby each member is caused to rock or swing in a direction counter to that of the adjacent members and whereby portions of the filter members are caused to engage each other to cause a jarring action that loosens the accumulated dirt on the surfaces of the said members. Still another object of the invention is to provide a removable receptacle in the lower part of the filter chamber or casing with means whereby such receptacle may be conveniently withdrawn with the accumulated dirt therein.

With these and other objects in view, the invention consists in the novel construction and arrangement of parts hereinafter described, illustrated in the accompanying drawings, and particularly pointed out in the appended claims, it being understood that various changes in the form and in minor details may be made without departing from the spirit of the invention or sacrificing any of the advantages thereof.

In the drawings, Fig. 1 is a side view of the filter casing with the means for the removal of the dirt from the lower part thereof. Fig. 2 is a perspective view showing the inner part of one of the filter members. Fig. 3 is a perspective view of one of the fabric filters. Fig. 4 is a similar view of the upper part of the filter member. Fig. 5 is a vertical section of the casing on the line 5—5, Fig. 1, and showing the filter mechanism. Fig. 6 is a horizontal plan view of the same. Fig. 7 is an enlarged sectional view showing part of a filter member and Fig. 8 is a cross-section of the same.

Referring to the drawings and particularly to Figs. 2, 3, 4, 7 and 8 showing the filter members, each filter member comprises a metallic frame 10 having a wire mesh core 11 and an outer covering 12 of cloth or other suitable filtering material, which is in the form of a bag having a central lower opening 13 for the passage of a nipple 14, while the open mouth 15 of the bag is folded over and clamped by the application of the channel member 16, and it is to be understood that other well known filtering devices of this type may be substituted. As shown at Figs. 7 and 8, the nipples 14 engage sockets 17 in a manifold 18 horizontally mounted in the casing 19 as shown at Fig. 5. Each channel member 16 (Fig. 4) is provided with a toothed wheel 20 and with a central upwardly projecting spindle 21 and these spindles 21 are in alignment with the nipples 14 and are mounted in bearings in a crossbar 22 suitably mounted in the casing 19, and one of the spindles 21 is extended upwardly and carries a crank 23 which is connected by means of a rod 24 to a crank pin 25 which latter is caused to rotate by the action of beveled gears 26 actuated by a crank handle 27 located outside the casing so that rotation of the handle 27 oscillates the crank 23 and imparts rocking movement to all the filter members so that adjacent members are rocked in opposite directions until they make contact with each other. The gear wheels 20 of adjacent filters engage each other so that the desired rocking motion and contact of the filters is obtained.

As clearly shown at Fig. 6, the filters are not all of the same width and the arrangement is such that the upper corner of each narrower filter is caused to swing until it contacts an adjacent filter of greater width and as the crank handle 27 is rotated the filters are all oscillated so that they contact each other as above described and a vibrating or jarring action is obtained.

The channel members 16 at the upper extremities of the filter members are arranged to thus make contact with each other and to transmit the vibration or jar to the filter members.

If so desired, the filter rocking mechanism may be actuated by power instead of by the hand crank 27 and for this purpose an electric motor 28 having suitable reducing gear 29 may be provided on a suitable bracket 30 on the front of the casing as shown at Fig. 1.

The casing 19 is provided with a removable cover 31 having clamps 32 and a vent pipe 33 with a shut-off valve 34. At the upper part of the casing an inlet pipe 35 admits dirt-laden fluid from the dry cleaning apparatus and at the lower part of the casing the said manifold 18 extends diametrically across the casing and is provided with the sockets 17 for the reception of the nipples 14 above referred to so that the filtered fluid from the interior of the filters passes through the nipples 14 to the manifold and may thus be conveyed back to the dry cleaning apparatus or to any suitable storage tank or the like. In the lower part of the casing between the manifold 18 and the base 36 of the casing, a receiver 37 having a perforated bottom 38 for the support of a filtering screen 39 of fabric or other suitable material is mounted on rollers 40 on the said base 36. At the front of this lower part, the casing is provided with a hinged door 41 having suitable clamps 42 and at the front of the casing a removable platform 43 having supporting wheels 44 may be provided for the reception and removal of the dirt receiver 37.

For the operation of the mechanism to clean the used fluid, the cover 31 and door 41 of the casing are closed and sealed and a drain pipe 45 is closed, and while the filters preferably remain in their midposition in parallel relation to each other, fluid that has been used in the operation of the dry cleaning apparatus is admitted to the casing through the pipe 35 and the shut-off valve 34 is opened to permit air in the upper part of the casing to escape through the pipe 33 and when such air has all escaped, the said valve is closed and the fluid is filtered by passing to the interior of the individual filters and from thence passing downwardly through the hollow nipples 14 and outwardly through the manifold 18. When the filters become coated with dirt on their external surfaces, the passage of fluid from the manifold 18 is stopped so that circulation through the casing may be temporarily interrupted and the crank handle 27 or the motor 28 is then operated so as to cause the rocking and jarring action of the filters as above described, with the result that the accumulated dirt and foreign matter become dislodged from the filtering surfaces and settle on the screen 39 in the receiver 37 at the lower part of the casing. During or immediately after this rocking operation, fluid may be caused to enter the casing through the upper pipe 35 and to pass outwardly through the drain pipe 45 in the bottom of the casing and, on the completion of this filter-cleaning operation as above described, the pipe 35 and manifold 18 are closed off, the upper part of the casing is vented through the valve 34 and the drain pipe 45 permits all the fluid to drain from the casing, after which the door 41 is opened and the receiver 37 is drawn onto the platform 43 by which it may be at once removed from the vicinity of the apparatus for suitable disposal.

Although the drawings and the above specification disclose the best mode in which I have contemplated embodying my invention, I desire to be in no way limited to the details of such disclosure, for, in the further practical application of my invention, many changes in form and construction may be made, as circumstances require or experience suggests, without departing from the spirit of the invention within the scope of the appended claims.

What I claim is:

1. Filter mechanism comprising a casing, a connection for the admission to the casing of the liquid to be filtered, a plurality of individually pivoted filter members with substantially flat side faces mounted in the casing, means whereby the individual filter members are rocked about their individual axes until each filter is stopped by jarring contact with an adjacent part, such rocking motion causing adjacent filter members to converge at one side of their axes and to diverge at the other side of said axes, and a connection for the withdrawal of filtered liquid from the filter members.

2. Filter mechanism comprising a casing, a connection for the admission to the casing of the liquid to be filtered, a plurality of rectangular filter members, means whereby alternate filter members are rocked until their corners are brought into jarring contact with the corners of the other filter members to dislodge accumulated dirt from the filter members, such rocking motion causing adjacent filter members to converge at one side of their axes and to diverge at the other side of said axes, and a connection for the withdrawal of filtered liquid from the filter members.

3. Filter mechanism comprising a casing, a connection for the admission to the casing of the liquid to be filtered, a plurality of substantially rectangular filter members mounted on spaced axes in said casing, power mechanism for swinging adjacent filter members simultaneously in opposite directions about said axes to bring their outer parts into jarring contact, and a connection for the withdrawal of filtered liquid from the filter members.

4. Filter mechanism comprising a casing, a connection for the admission to the casing of the liquid to be filtered, a plurality of filter members in the casing, a manifold for the reception of filtered liquid from said members, a hollow nipple on the lower part of each filter member, spaced sockets in said manifold receiving said nipples and serving as bearings therefor, means causing each filter member to turn with its nipple in a socket to displace each filter member with respect to an adjacent member and to bring the filter members into jarring contact with each other to dislodge dirt therefrom.

5. Filter mechanism comprising a casing, a connection for the admission to the casing of the liquid to be filtered, a plurality of filter members in the casing, a manifold receiving the filtered liquid from said members, a hollow nipple on the lower part of each filter member, a socket in said manifold receiving each nipple and serving as a rotary bearing therefor, and power mechanism rocking adjacent filter members simultaneously in opposite directions into jarring contact to dislodge dirt therefrom by the jarring action.

6. Filter mechanism comprising a casing, a connection for the admission to the casing of the liquid to be filtered, a plurality of flat flexible filter members in the casing, a manifold for the reception of the filtered liquid from said members, a hollow nipple on the lower part of each filter member, spaced sockets in said manifold receiving said nipples and serving as spaced rotary bearings therefor, and means for rocking said filter members simultaneously in opposite directions into jarring contact with each other to dislodge dirt therefrom.

7. Filter mechanism comprising a casing, a connection for the admission to the casing of the liquid to be filtered, a plurality of filter members in the casing, a manifold for the reception of filtered liquid from said members, a rotary connection between each filter member and the manifold, means for rocking one of the filter members about a substantially central axis, means whereby such rocking motion is transmitted to the adjacent filter members to cause the latter to simultaneously rock in the opposite direction to cause jarring contact between adjacent filter members to dislodge dirt therefrom, such rocking motion causing adjacent filter members to converge at one side of their axes and to diverge at the other side of said axes.

8. Filter mechanism comprising a casing, a connection for the admission to the casing of the liquid to be filtered, a plurality of filter members in the casing, a manifold for the reception of filtered liquid from said members, a hollow rotary connection between each filter member and the manifold, crank mechanism for rocking one of the filter members about a substantially vertical axis, and means transmitting such rocking motion to adjacent filter members causing the latter to move into jarring contact with the crank-actuated member.

9. Filter mechanism having a casing, a connection for the admission to the casing of the liquid to be filtered, a plurality of filter members within the casing, a manifold for the reception of filtered liquid from said members, a movable connection between each filter member and the manifold, means for swinging one of the filter members about a substantially vertical axis, and means transmitting swinging motion in the opposite direction to adjacent filter members causing jarring contact of the upper corners of one of the members with the upper parts of adjacent members, such swinging motion causing adjacent filter members to converge at one side of their axes and to diverge simultaneously at the other side of said axes.

10. Filter mechanism comprising a casing, a connection for the admission to the casing of the liquid to be filtered, a plurality of filters of flat flexible material mounted in the casing in spaced relation to each other, a drain in the bottom of the casing, and means for rocking adjacent filter members in opposite directions with respect to each other to dislodge the dirt from the flat external surfaces of said members by the jarring contact of the members and by the consequent bulging of the flexible material, such rocking motion causing adjacent filter members to converge at one side of their axes and to diverge at the other side of said axes.

11. Filter mechanism comprising a casing, a connection for the admission to the casing of the liquid to be filtered, a plurality of flat filter members mounted in the casing in spaced relation to each other, means for rocking adjacent filter members in opposite directions into jarring contact with each other to jar the dirt from the external surfaces of said members, such rocking motion causing adjacent filter members to converge at one side of their axes and to simultaneously diverge at the other side of said axes, a manifold receiving the filtered liquid from the filter members to convey such liquid from the casing, a drain pipe in the bottom of the casing, a dirt receiver in the lower part of the casing, and a strainer in the dirt receiver.

12. Filter mechanism comprising a casing, a connection for the admission to the casing of the liquid to be filtered, a plurality of substantially flat and rectangular filter members mounted in the casing in normally parallel relation to each other, mechanism for rocking adjacent filter members simultaneosuly in opposite directions about spaced axes to bring their corners into jarring contact to dislodge the dirt from the flat external surfaces of said members, a manifold receiving the filtered liquid from the filter members to convey such liquid from the casing, rotary joints for the passage of the liquid from the filter members to said manifold, a drain pipe in the bottom of the casing, a removable dirt collector in the lower part of the casing, and a strainer in the lower part of said collector.

MARTIN LAX.

REFERENCES CITED

The following references are of record in the file of this patent:

UNITED STATES PATENTS

| Number | Name | Date |
| --- | --- | --- |
| 652,139 | Pedrick | June 19, 1900 |
| 779,013 | Wahnsielder | Jan. 3, 1905 |
| 1,264,635 | Graham | Apr. 30, 1918 |
| 2,013,776 | Wiesman | Sept. 10, 1935 |
| 2,278,148 | Monsarrat et al. | Mar. 31, 1942 |
| 2,301,430 | Malanowski | Nov. 10, 1942 |
| 2,460,416 | Goodrich | Feb. 1, 1949 |
| 2,475,561 | Cooperider et al. | July 5, 1949 |
| 2,480,320 | Carrier | Aug. 30, 1949 |

FOREIGN PATENTS

| Number | Country | Date |
| --- | --- | --- |
| 679,892 | France | Jan. 14, 1930 |